United States Patent
Valsecchi (10) Patent No.: US 11,439,269 B2
(45) Date of Patent: Sep. 13, 2022

(54) BREWING APPARATUS FOR PREPARING A BEVERAGE FROM A SINGLE-SERVE CAPSULE

(71) Applicant: Gruppo Gimoka S.r.l., Trezzano Sul Naviglio (IT)

(72) Inventor: Massimiliano Valsecchi, Trezzano Sul Naviglio (IT)

(73) Assignee: Gruppo Gimoka S.r.l., Trezzano Sul Naviglio (IT)

( * ) Notice: Subject to any disclaimer, the term of this patent is extended or adjusted under 35 U.S.C. 154(b) by 576 days.

(21) Appl. No.: 16/472,133

(22) PCT Filed: Dec. 22, 2017

(86) PCT No.: PCT/IB2017/058363
§ 371 (c)(1),
(2) Date: Jun. 20, 2019

(87) PCT Pub. No.: WO2018/116277
PCT Pub. Date: Jun. 28, 2018

(65) Prior Publication Data
US 2019/0313835 A1    Oct. 17, 2019

(30) Foreign Application Priority Data
Dec. 23, 2016    (IT) .................... 102016000130860

(51) Int. Cl.
A47J 31/40    (2006.01)
A47J 31/36    (2006.01)

(52) U.S. Cl.
CPC ......... *A47J 31/407* (2013.01); *A47J 31/3695* (2013.01)

(58) Field of Classification Search
USPC ................................... 99/295, 297
See application file for complete search history.

(56) References Cited

U.S. PATENT DOCUMENTS

| | | | |
|---|---|---|---|
| 2010/0071563 A1* | 3/2010 | Ryser ................ | A47J 31/3633 99/295 |
| 2014/0287104 A1* | 9/2014 | Austin ................ | A47J 31/407 426/115 |
| 2015/0135965 A1* | 5/2015 | Lo Foro ............. | A47J 31/3633 99/285 |

FOREIGN PATENT DOCUMENTS

| | | |
|---|---|---|
| EP | 1518484 | 3/2005 |
| KR | 101215531 | 12/2012 |

(Continued)

OTHER PUBLICATIONS

Cho Chul Min, KR-20150142467-A English Translation, (Year: 2015).*

(Continued)

*Primary Examiner* — Phuong T Nguyen
(74) *Attorney, Agent, or Firm* — McCarter & English, LLP (57) ABSTRACT

A beverage brewing apparatus for preparing a beverage from a single-serve capsule, the beverage brewing apparatus comprises a capsule holder to receive a capsule in a brewing position, and an injection unit to perforate a capsule in the brewing position and to feed a brewing fluid into the capsule; the injection unit comprises a pair of hollow needles designed to supply respective flow rates different from each other, and an actuator to bring, during a beverage production cycle, only one of the two needles to an operating position, in which the needle perforates the capsule and injects a certain amount of brewing fluid into the capsule.

9 Claims, 10 Drawing Sheets

(56) References Cited

FOREIGN PATENT DOCUMENTS

| KR | 20150142467 A | * | 12/2015 |
| WO | WO 2009113035 | | 9/2009 |
| WO | WO 2016/142157 | | 9/2016 |

OTHER PUBLICATIONS

PCT International Search Report and Written Opinion for PCT/IB2017/058363 dated Apr. 25, 2018.

* cited by examiner

BREWING APPARATUS FOR PREPARING A BEVERAGE FROM A SINGLE-SERVE CAPSULE

CROSS-REFERENCE TO RELATED APPLICATIONS

This application is a 35 U.S.C. § 371 National Stage filing of International Application No. PCT/IB2017/058363 filed on Dec. 23, 2017, which claims priority to Italian Patent Application 102016000130860 filed on Dec. 23, 2016.

FIELD OF THE INVENTION

The present invention relates to a brewing apparatus for preparing a beverage from a single-serve capsule containing a dose of infusible or soluble material, such as coffee, tea, chocolate, milk, etc.

In particular, the present invention relates to a brewing apparatus for use in automatic machines for producing beverages from capsules designed to be perforated, at the beginning of a dispensing cycle, by perforating means carried by said brewing apparatus to allow a brewing fluid to be injected into the capsule.

DESCRIPTION OF RELATED ART

As is known, the market currently offers various types of capsules which differ from one another both physically in their shape, size and internal structure, and functionally, that is, in terms of the characteristics that the brewing process must have so that, having regard to the structure of the capsule and to the type, quantity and grain size of the material contained therein, the beverage produced has the desired characteristics.

In general, certain beverages require the respective capsules to be extracted by means of a high-pressure brewing process, in which the brewing fluid is fed into the capsule at a relatively low flow rate and relatively high speed, whereas other beverages require the respective capsules to be extracted by means of a low-pressure brewing process, in which the brewing fluid is fed into the capsule at a relatively high flow rate and relatively low speed.

This diversification in terms of capsules and type of beverage has given rise to the need for automatic brewing apparatuses which, using capsules that are externally identical, are able to implement different brewing processes according to the type of beverage to be produced.

To that end, many solutions have been proposed in recent years, most of which are based on the introduction of various systems for adjusting the parameters that control the brewing process. Such solutions, while effective in some cases, generally have the drawback of making the brewing apparatus more complex both from a structural perspective and in terms of its functioning and control, with the negative consequence of increasing the costs and reducing the reliability of said brewing apparatus.

WO 2016/142157 A1 relates to a device for preparing beverages from a capsule. The device comprises capsule opening means designed to interact with an injection face of the capsule and comprise a liquid injection needle, a gas injection needle, and activation means designed to sequentially move the liquid injection needle and the gas injection needle to a position of interaction with the injection face of the capsule.

SUMMARY OF THE INVENTION

The purpose of the present invention is to provide a brewing apparatus, which is a simple and economical alternative to the known solutions mentioned above.

According to the present invention a brewing apparatus is provided as claimed in claim 1 and, preferably, in any one of the subsequent claims depending directly or independently on claim 1.

BRIEF DESCRIPTION OF DRAWINGS

The invention will now be described with reference to the accompanying drawings, illustrating a non-limiting embodiment thereof, in which.

DETAILED DESCRIPTION OF THE INVENTION

Figure 1:
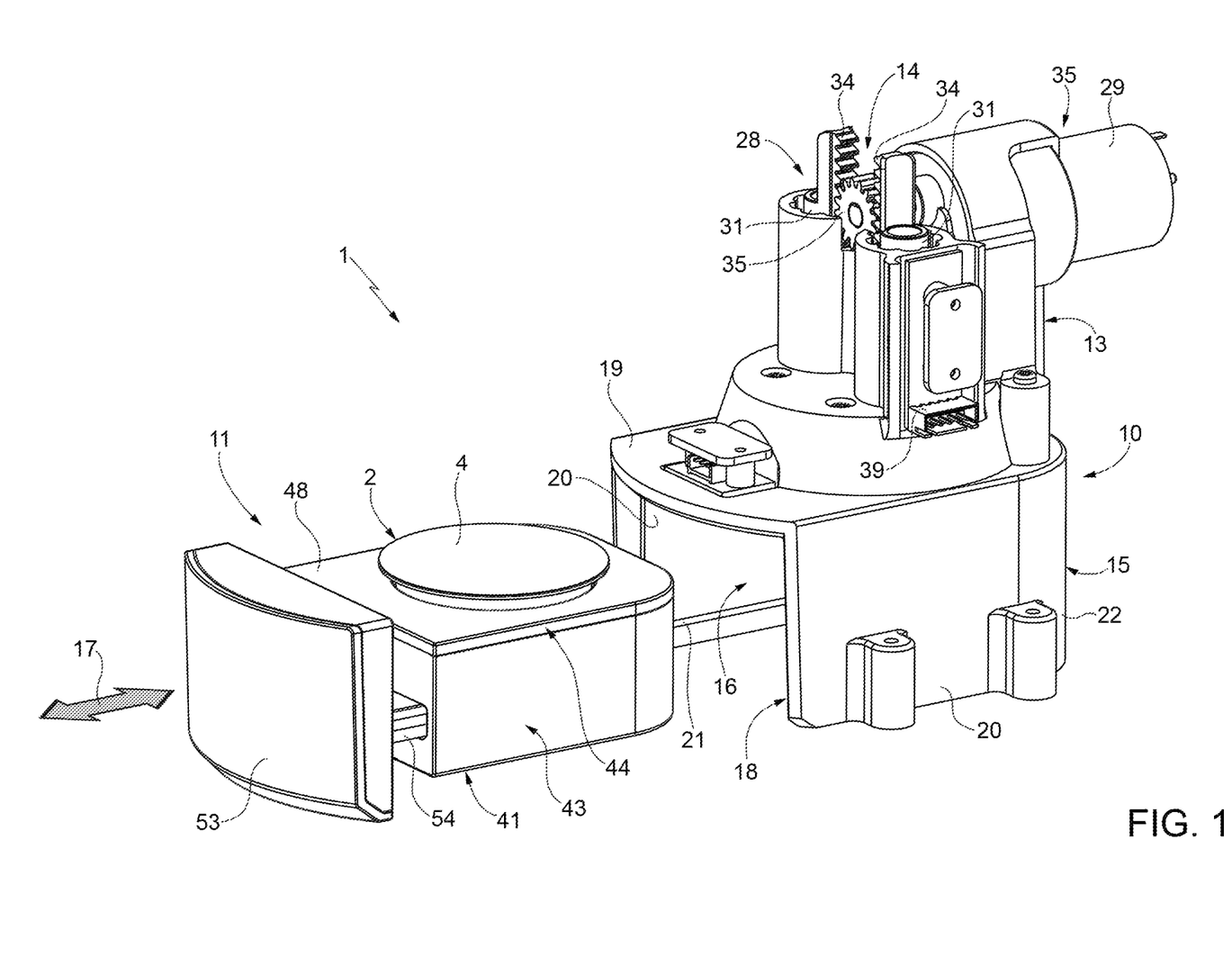
FIG. 1 is a perspective view of a preferred embodiment of the brewing apparatus according to the present invention.

In FIG. 1, denoted as a whole by reference numeral 1 is a brewing apparatus suitable for use in an automatic machine for producing beverages by injecting a brewing fluid, typically pressurized hot water, into single-serve capsules containing a dose of infusible or soluble material, for example coffee, tea, chocolate, milk, etc.

In particular, the brewing apparatus 1 is structured to implement the automatic brewing process starting from capsules 2 of the (known) type comprising a container designed to be perforated, in use, by perforating means borne by the brewing apparatus 1 to permit the injection of the brewing fluid into said capsule 2.

As will become more apparent from the following description, the brewing apparatus 1 is configured to permit the use, in the same automatic machine, of capsules that are identical to one another as far as their geometry and outside dimensions are concerned, but differ for the material they contain in terms of form, compactness and quantity, and for their internal structure.

Purely by way of example, the accompanying figures illustrate a capsule 2 of the type described above, which comprises a cup-shaped body with a beverage outflow aperture 3 at the bottom, and a cover 4, which is seal-welded to an annular flange 5 on the outside of the cup-shaped body and consists of a perforable membrane, preferably obtained from a single or multi-layer sheet of plastic and/or metal material.

The cup-shaped body is made of a waterproof plastic material, preferably obtained by thermoforming a material with oxygen and moisture barrier properties such as PP-EVOH-PP, for example, or by means of injection moulding with Polypropylene (PP) or Polybutylene terephthalate (PBT), and houses a filtering element 6, which divides the inside of the capsule 2 into an upper chamber containing the infusible material and a lower chamber communicating with the beverage outflow aperture 3. The capsule 2 is further provided with a sealing film 7 connected to an inside surface of the cup-shaped body to seal the outflow aperture 3 and which is designed to be perforated, following an axial compression of the capsule 2 and the subsequent collapsing of the cup-shaped body, by a tip 8 borne by the filtering element 6.

According to the above description, the capsule 2 may be produced, as known in the prior art, in different versions depending on the type of beverage it is to produce. The different versions of the capsule 2 differ for the addition or absence of certain components inside the capsule 2 and, in general, can be grouped into two categories according to the type of brewing process required to obtain the respective beverages.

A first category comprises capsules that require a high-pressure brewing process, in which the injection fluid is fed into said capsule at a relatively low flow rate and relatively high speed. Capsules of this type are used, for example, to produce espresso coffee or soluble beverages.

A second category comprises capsules that require a low-pressure brewing process, in which the injection fluid is fed into said capsule at a relatively high flow rate and relatively low speed. Capsules of this type are used, for example, to produce so-called "Americano" coffee, or tea and other infusions.

With reference to the capsule 2 illustrated in the accompanying figures, the inside structure may vary according to the beverage that the capsule 2 is to produce.

For example, the openings in the filtering element 6 may have different shapes and sizes; there may be a barrier element consisting of one or more superimposed membranes, possibly pre-cut, welded to the lower surface of the filtering element 6 to improve the pre-brewing of the material; the sealing film 7 may be missing or may be replaced with a manually removable external film. Furthermore, for capsules designed for high-pressure brewing, the capsule 2 may comprise (FIG. 6) a micro-perforated sheet 9 arranged in the upper chamber at a certain distance from the cover 5 to define an empty space between the material and the cover 4 and, in use, aid the uniform distribution of the brewing fluid.

Figure 2:
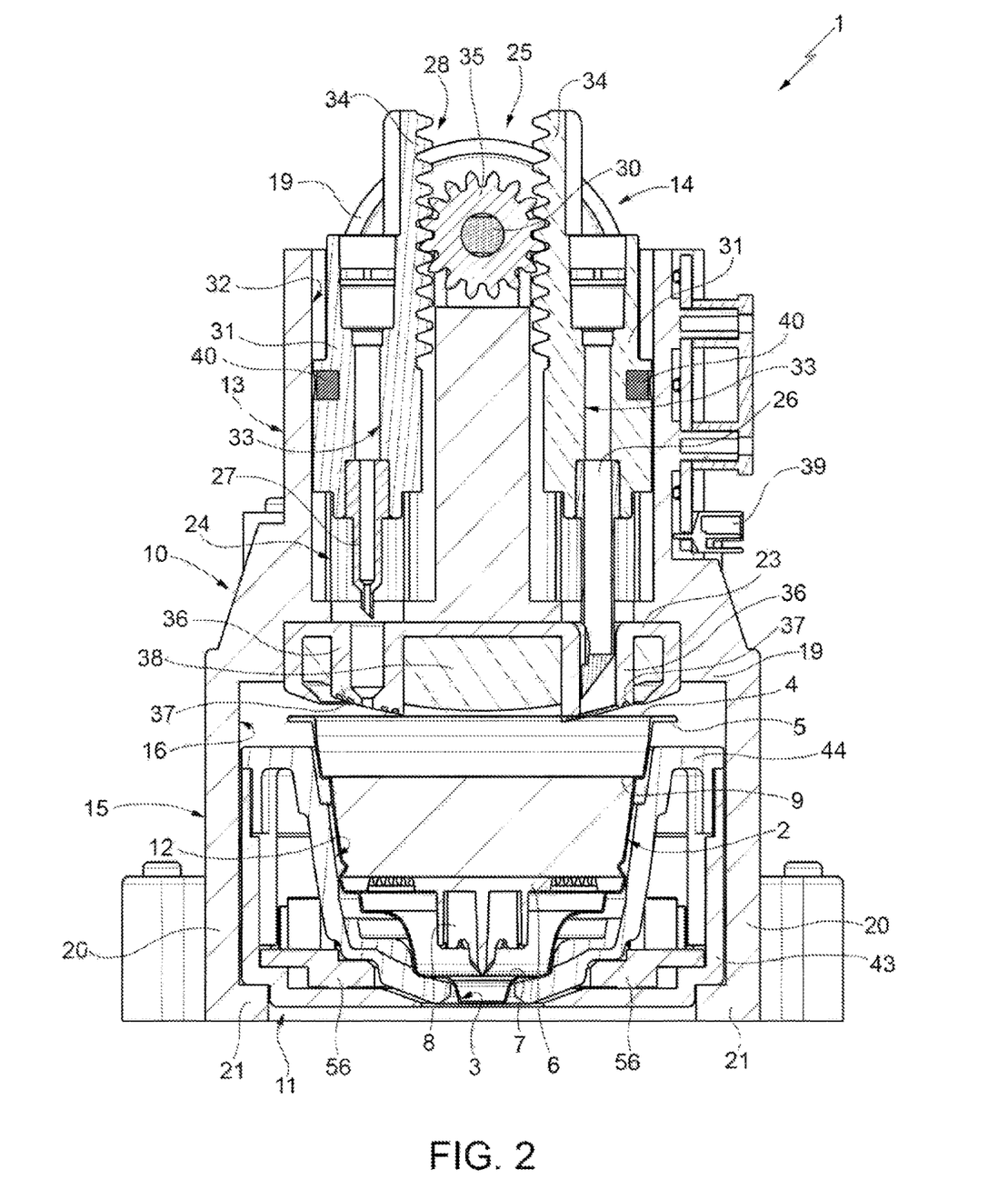
FIG. 2 is a front cross-sectional view of the brewing apparatus of FIG. 1 in a first operating configuration.

With reference to FIGS. 1 and 2, the brewing apparatus 1 comprises a frame 10, designed to be fixed to the inside of a casing (not illustrated) of the automatic machine, and a capsule holder 11 provided with a cavity 12 configured to receive a capsule 2.

The frame 10 comprises an upper portion 13, which supports a water injection unit 14, and a lower portion 15, which defines a seat 16 suitable to be removably engaged by the capsule holder 11 to support it in a brewing position under the injection unit 14.

Figure 4:
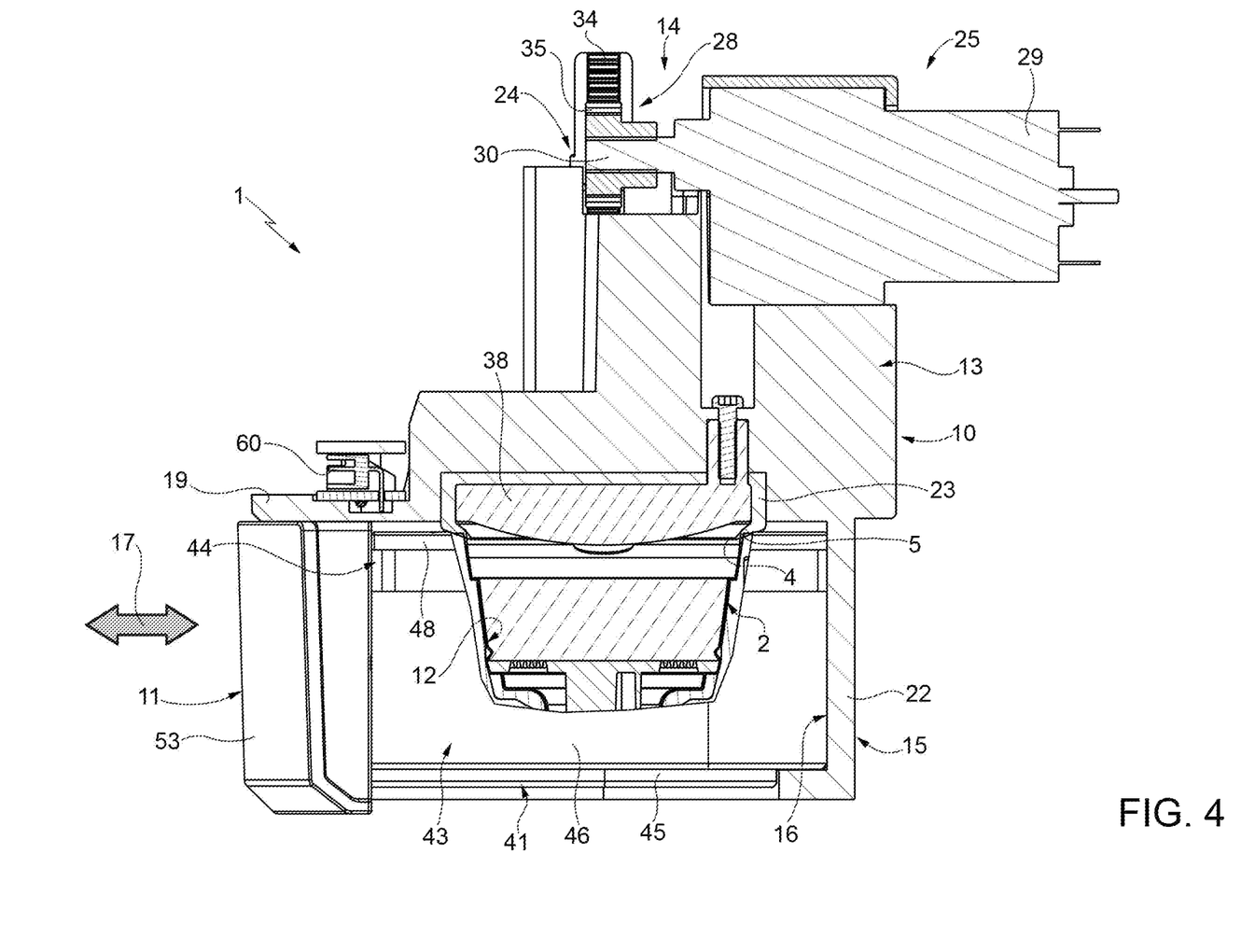
FIG. 4 illustrates the brewing apparatus of FIG. 3 in a different operating configuration.

According to that illustrated in FIG. 1, the capsule holder 11, which will be described in detail later on in this document, is designed as a drawer able to slide in an insertion/extraction direction 17 (indicated by a double arrow in FIG. 1) between an extracted loading position, in which the capsule holder 11 is outside the seat 16 to allow a user to remove an empty capsule 2 from the cavity 12 and load a new capsule 2 (FIG. 1), and said brewing position, in which the capsule holder 11 is fully inserted into the seat 16 (FIG. 4). In the preferred embodiment that is illustrated, the capsule holder 11 can be detached from the frame 10. According to an alternative embodiment, the capsule holder 11 may only be partially extracted from the seat 16 provided this is sufficient to allow the user to access the cavity 12 to load or remove a capsule 2.

Figure 3:
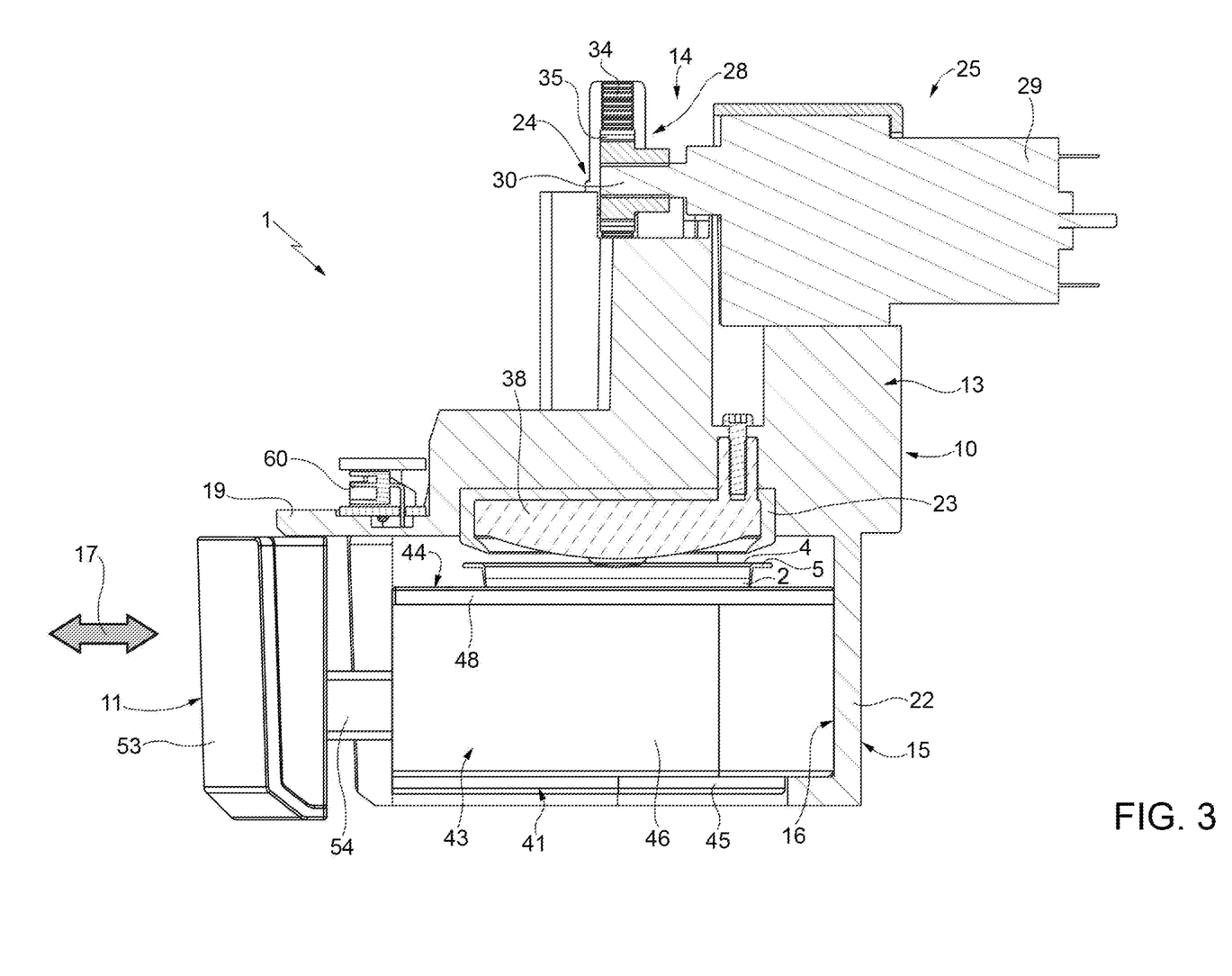
FIG. 3 is a side and partially cross-sectional view of the brewing apparatus of FIG. 1.

With reference to FIGS. 1, 2 and 3, the seat 16 has an entrance 18 and is defined by a substantially horizontal upper wall 19 and by two substantially vertical side walls 20, parallel to one another and to the direction 17 and provided with respective lower edges 21, which are bent towards one another and towards the inside of the seat 16 so as to define, with the respective side walls 20, a straight guide suitable to be engaged in a sliding manner by the capsule holder 11 in the direction 17.

At the end opposite to the entrance 18, the seat 16 is bounded by a transverse wall 22 (FIG. 3), which joins the side walls 20 to one another and defines a stop member to stop the capsule holder 11, when the latter is inserted into the seat 16, in a given position with respect to the injection unit 14, that is to say, in said brewing position.

According to that illustrated in FIGS. 1 and 2, when the capsule holder 11 is arranged in the brewing position, the cavity 12 in the capsule holder 11 faces a cup-shaped gasket 23, which is firmly inserted in a cavity provided in the upper wall 19, with its concave side facing downwards, and has an annular end lip designed to couple, in use, with the cover 4 of a capsule 2, roughly at the respective flange 5, to define a radial seal around a central area of the cover 4 to be perforated to allow the pressurized hot water to be fed into the capsule 2.

For that purpose, the injection unit 14 comprises a needle injection device 24, an actuator device 25 to operate the needle injection device 24, and water feeding means to supply water at a given pressure to the needle injection device 24.

The needle injection device 24 comprises a pair of hollow needles 26 and 27, which are supported by the upper portion 13 of the frame 10 above the cup-shaped gasket 23 and each of which is movable in a vertical direction between a respective normal rest position, in which the needle is retracted and does not protrude beyond the cup-shaped gasket 23, and a respective operating position, in which the needle is in a forward position and protrudes beyond the cup-shaped gasket 23 in order to penetrate the cover 4 of a capsule 2 arranged in the capsule holder 11 in the brewing position to inject the pressurized hot water into said capsule 2.

The injection unit 14 is dimensioned in such a way that the needles 26 and 27 are able to supply respective different water flow rates to the capsule 2.

The needles 26 and 27 have different inside diameters to one another and are selectively operated according to the type of capsule 2 to be processed.

According to one embodiment, the water supply means comprise a single fixed displacement pump fluidically connected to both of the needles 26 and 27 to supply water to the respective needles 26 and 27 at the same flow rate. Alternatively, the pump is a variable displacement pump in order to supply water to the respective needles 26 and 27 at different flow rates.

According to an alternative embodiment, the water supply means comprise two fixed or variable displacement pumps, each of which is fluidically connected to a respective needle 26 and 27 to supply water to the needle in the operating position at a given flow rate.

The needles 26 and 27 are kinematically connected to the actuator device 25 by means of a transmission 28 configured so as to make only one of the two needles 26 and operational, in each delivery cycle, by moving said needle from the respective rest position to the respective operating position.

According to the preferred embodiment illustrated in the accompanying figures, the transmission 28 is a mechanical transmission and the actuator device 25 that operates it comprises an electric motor 29 connected to an electronic control unit (not illustrated) and has a power output shaft 30 able to rotate about an axis parallel to the direction 17.

With particular reference to FIGS. 1, 2, 5 and 7, the transmission 28 comprises two sliding blocks 31, each of which carries a respective needle 26, 27 in a rigidly coupled manner and is defined by a tubular generally cylindrical body slidingly mounted in a respective guide channel 32 obtained in the upper portion 13 of the frame 10 and open towards the seat 16.

Each sliding block 31 has an axial duct 33, which comprises a widened upper portion, suitable to be engaged by a connection (not illustrated) for coupling to a delivery pipe of the water pump (not illustrated), and a widened lower position engaged, preferably in a detachable manner, by an axial end of the respective needle 26, 27.

The two sliding blocks 31 are arranged on opposite sides of the shaft 30 of the motor 29 and comprise respective toothed flat upper portions, which define respective racks 34 facing and parallel to one another and both meshing with a pinion 35 splined to the shaft 30 and which is part of the transmission 28.

Thus, the needles 26 and 27 are both constantly coupled to the transmission 28 and the displacement of one of the two corresponds to a simultaneous displacement of the other of the same magnitude and in the opposite direction. In practice, while the "operational" needle is moved from the normal rest position to the operating position, the other needle is moved from the normal rest position to a retracted waiting position by performing an equal and opposite displacement with respect to that of the "operational" needle.

According to that illustrated in FIG. 2, each needle 26, 27 is axially aligned with a respective tubular appendix 36 of the cup-shaped gasket 23, said appendix extending downwards, from a bottom wall of the cup-shaped gasket 23, up to, and preferably slightly beyond, the annular end lip of said cup-shaped gasket 23. Each tubular appendix 36 is suitable to be slidingly engaged by the respective needle 26, 27 when the latter moves to the extracted operating position, and is shaped and dimensioned to fluid-tightly couple with the external surface of the part of needle that axially engages it.

Lastly, the tubular appendages 36 have respective ends 37 which, when the capsule 2 is fluid-tightly coupled to the cup-shaped gasket 23 (FIG. 4), are pressed against the cover 4 and define respective annular seals suitable to prevent any water or beverage that has come out of the hole made by the "operational" needle and on to the cover 4 from entering the tubular appendages 36 and possibly reaching the channels 32.

To that end, to facilitate the adherence of the ends 37 of the tubular appendages 36 to the cover 4, the cup-shaped gasket 23 internally houses an abutment element 38 rigidly connected to the frame 10 (FIG. 3) and bounded at the bottom by a surface that is rounded towards the bottom, which, when the capsule 2 is pressed against the cup-shaped gasket 23, engages the central portion of the cover 4 and pushes it inwardly into the capsule 2 to such an extent as to stretch said cover 4. Preferably, to further improve the fluid-tight coupling between the end 37 and the cover 4, the end surface of each end 37 is inclined with respect to the longitudinal axis of the respective tubular appendage 36 at an angle such as to complement the curvature of the cover 4 in the connection area and adhere to the cover 4 in an effective manner.

FIG. 2 illustrates the rest position of the needle 26, which is the needle with the larger inside diameter capable of delivering water at a higher flow rate than the needle 27, and the rest position of the needle 27, which is the needle with the smaller inside diameter and delivers a lower flow rate. In their normal rest positions, the needles 26 and 27 may be arranged, according to their length, completely inside the respective channels 32 (as is the case of the needle 27 in the example that is illustrated) or protrude from the respective channel 32 and engage a first section of the respective tubular appendage 36 (as is the case of the needle 26 in the example that is illustrated), but without extending, in any case, beyond the end 37 of said tubular appendage 36.

Figure 5:
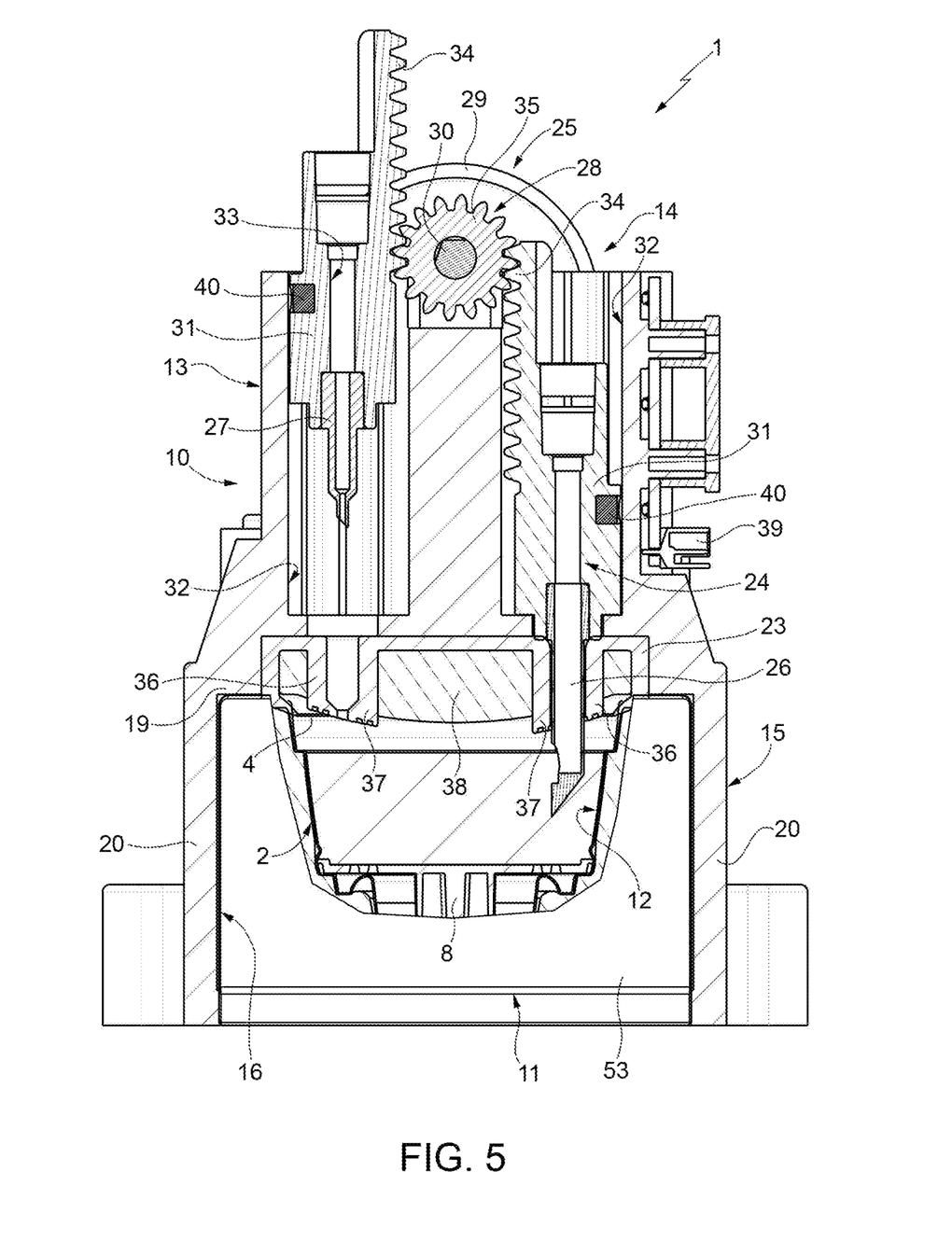
FIGS. 5 and 6 illustrate the brewing apparatus of FIG. 2 in two further different operating configurations.

FIG. 5 illustrates the configuration of the needle injection device 24 when the needle 26 is in the extracted operating position and, consequently, the needle 27 is in its retracted waiting position. Normally, needles like the needle 26, which supply a high flow rate and at low speed, are used for capsules 2 designed to produce beverages that have to be extracted at low pressure, for example infusions or Americano-type coffee; such capsules do not normally have the aforesaid micro-perforated sheet 9. In order to improve the penetration of the water into the material, needles of this type are normally made to penetrate the capsule 2 relatively deeply so as to inject water directly into the dose of material to be brewed. In the preferred embodiment that is illustrated, the needle 26 comprises a hollow cylindrical stem, a solid tip cut obliquely, and a water outlet on the side facing the centre of the capsule 2 in order to facilitate the circulation of the water through the material to be brewed.

Figure 6:
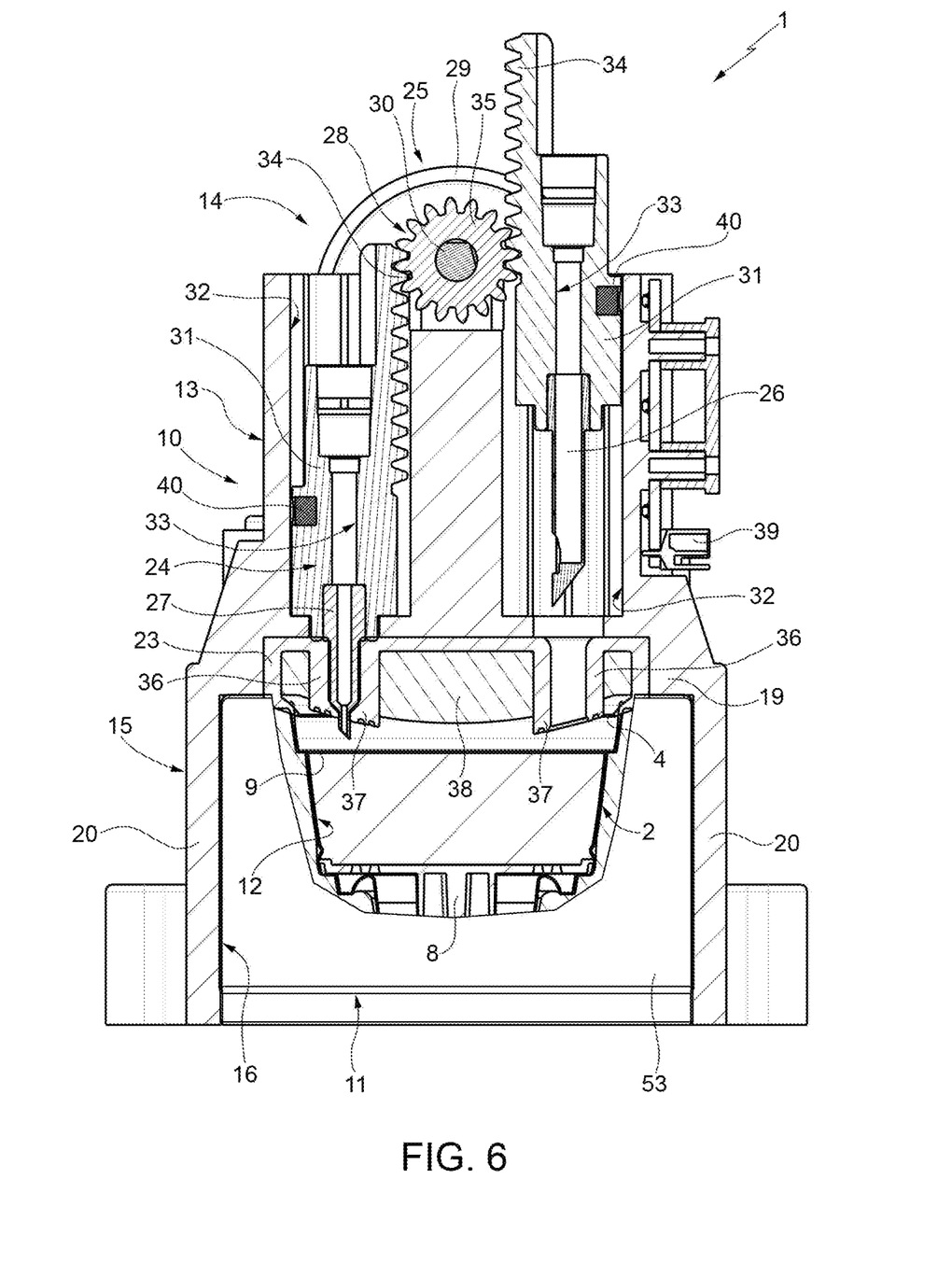
Figure 7:
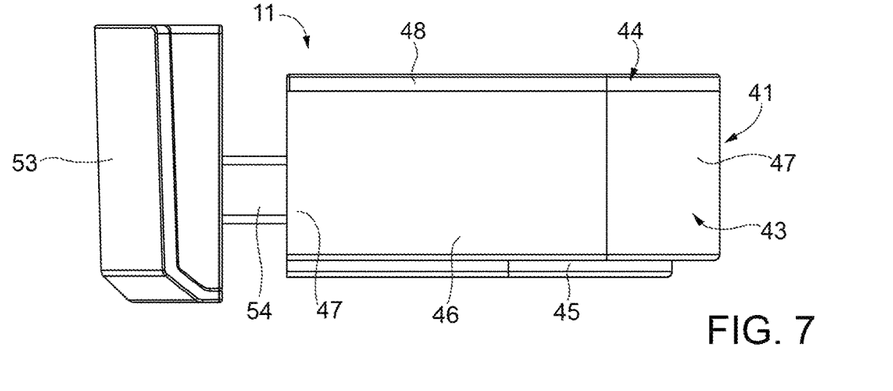
FIG. 7 is a side elevation view of a detail of the apparatus of FIG. 1.

FIG. 6 illustrates the configuration of the needle injection device 24 when the needle 27 is in the extracted operating position and, consequently, the needle 26 is in the retracted waiting position. Normally, needles like the needle 27, which supply a low flow rate and at high speed, are used for capsules 2 designed for producing beverages that have to be extracted at high pressure, for example espresso coffee; such capsules are normally provided with the aforesaid micro-perforated sheet 9 which has the function of distributing the water and ensuring that it penetrates the material in a uniform manner. In such cases, after perforating the cover 4, the needle does not penetrate the material directly, but remains between the cover 4 and the micro-perforated sheet 9. In the preferred embodiment that is illustrated, the needle 27 comprises a hollow cylindrical stem with a thin tip portion and an axial opening through which the water flows out.

In use, the selective activation of the needles 26 and is controlled by the electronic control unit (not illustrated), which, depending on the type of capsule 2 inserted by a user, that is, according to the type of beverage to be produced, drives the motor 29 in one direction or the other in order to bring one of the two needles to perforate the capsule 2.

The time for which the motor 29 is driven and, thus, the length of the displacement of the "operational" needle 26 or 27 from the rest position to the extracted operating position, is controlled by the electronic control unit (not illustrated) on the basis of signals sent to said electronic unit by sensor means designed to detect the axial position of the sliding blocks 31 along the respective guide channels 32. In the preferred embodiment that is illustrated, said sensor means consist, for example, of a Hall effect sensor 39 (of the conventional type) mounted on the upper portion 13 of the frame 10 and coupled to magnets 40 mounted on the sliding blocks 31.

With regard to the above description, it is worth pointing out that, according to alternative embodiments that are not illustrated, the transmission 28 could be different from that illustrated, for example it could consist of a mechanical linkage transmission or a hydraulic transmission. In particular, according to an alternative embodiment that is not illustrated, the transmission 28 could be configured to move, each time, only the needle selected to perforate the capsule, leaving the other needle stationary in the respective rest position. Likewise, according to alternative embodiments that are not illustrated, the displacements of the needles 26 and 27 could be controlled on the basis of sensors other than the Hall effect sensor described above, for example by using an encoder coupled to the shaft 30 of the electric motor 29 or a hydraulic system or any other system suitable for the purpose.

The structure and the functioning of the capsule holder 11, which constitutes a further aspect of the present invention, and is separate from the injection unit 14, will now be described in detail.

As already mentioned above, the capsule holder 11 is designed as a drawer able to slide in the insertion/extraction direction 17 between an extracted loading position, in which a capsule 2 can be loaded into/removed from the cavity 12, and a brewing position, in which the capsule holder 11 is inserted into the seat 16 in the frame 10 and the cavity 12, with the capsule 2 that has been inserted, is arranged underneath and in a position coaxial to the cup-shaped gasket 23.

In addition to the function described above of bearing and supporting the capsule 2 in a position facing the cup-shaped gasket 23, the capsule holder 11 is also configured to move the capsule 2 from and towards a fluid-tight coupling position with said cup-shaped gasket 23.

Figure 12:
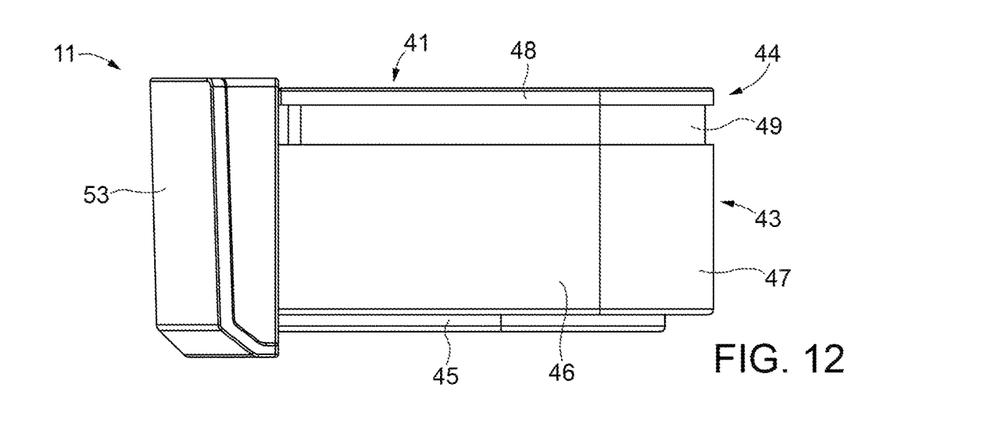
FIG. 12 illustrates the detail of FIG. 7 in a different operating configuration.
Figure 13:
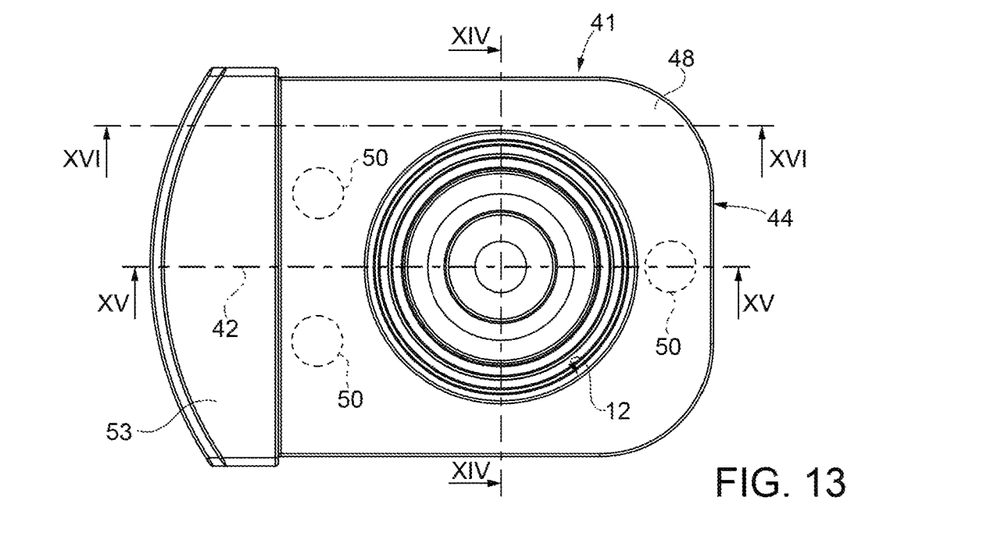
FIG. 13 illustrates the detail of FIG. 8 in a different operating configuration.
Figure 14:
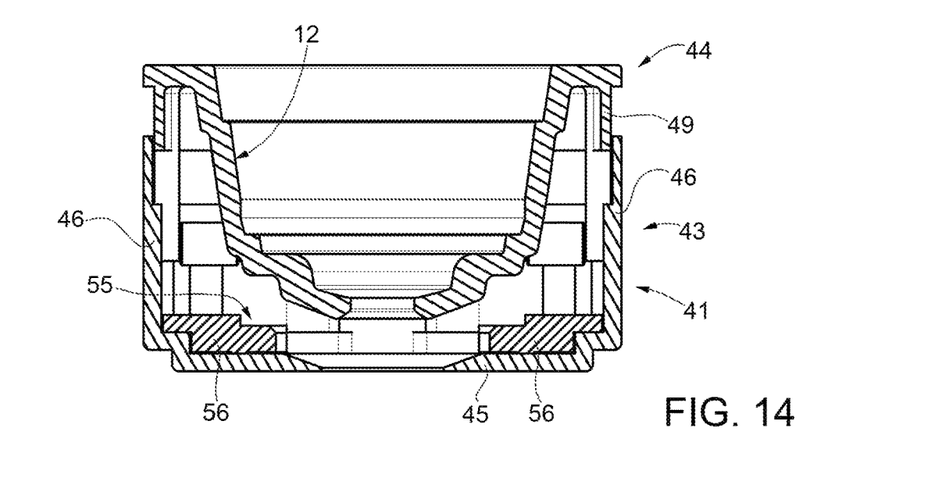
FIG. 14 is a cross section, along the plane IVX-IVX, of FIG. 13.
Figure 15:
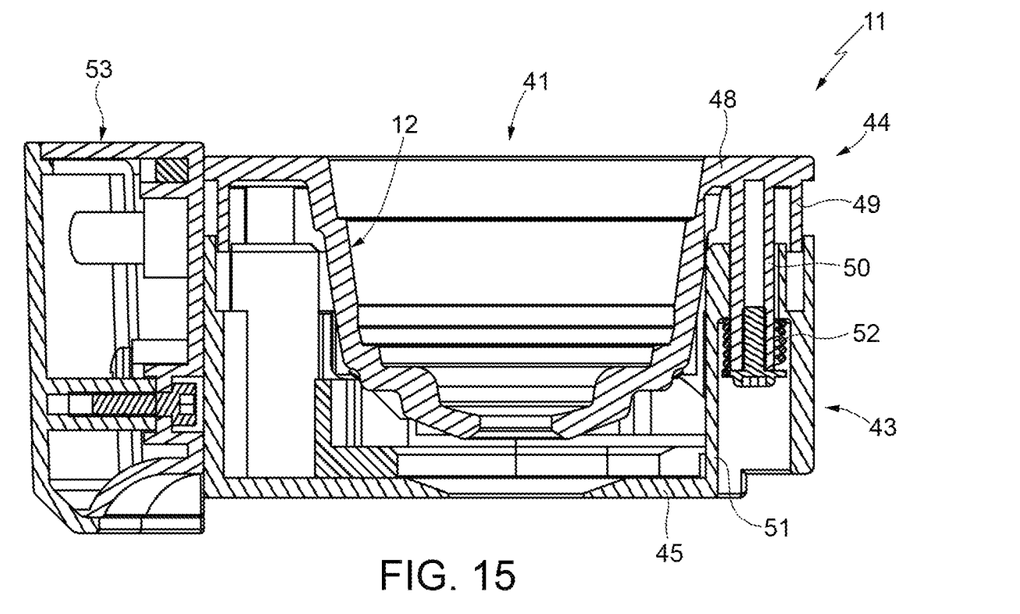
FIG. 15 is a cross section, along the plane XV-XV, of FIG. 13.

In particular, according to that illustrated in FIGS. 7 to 15, the capsule holder 11 comprises a main body 41, which has a longitudinal axis 42 that is parallel to the direction 17 of insertion/extraction when the capsule holder 11 is inserted into the seat 16, and comprises a lower portion 43 and an upper portion 44, which engages the top of the lower portion 43, is provided with the cavity 12 and is slidingly coupled to the lower portion 43 so as to move, with respect to said lower portion 43, in a vertical direction between a lowered position, in which the cavity 12 is arranged inside the lower portion 43 (FIGS. 9 and 10) and a raised position, in which the cavity is partially extracted from the lower portion 43 (FIGS. 14 and 15).

According to the preferred embodiment of the example that is illustrated, the lower portion 43 is generally cup shaped and comprises a bottom wall 45 and a side wall comprising, in turn, two longitudinal walls 46 arranged on opposite sides of the axis 42 and two transverse walls 47 perpendicular to the longitudinal walls 46. The upper portion 44, on the other hand, comprises an upper wall 48, which has a generically rectangular shape, has a sunken central part open at the bottom and defining the cavity 12, and is provided, along its periphery, with an annular edge 49 that extends downwards perpendicularly to the upper wall 48 and slidingly engages an inside surface of the side wall of the lower portion 43.

Figure 8:
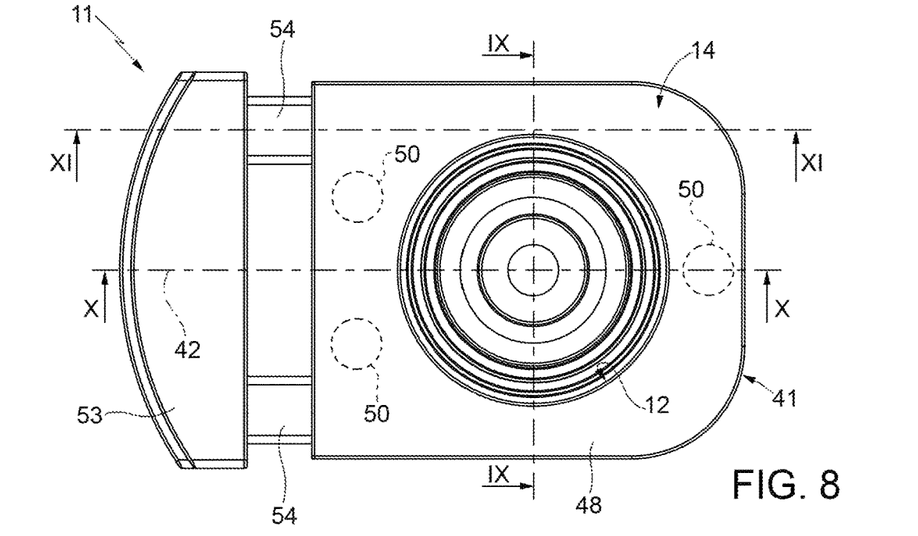
FIG. 8 is a plan view of the detail of FIG. 7.
Figure 9:
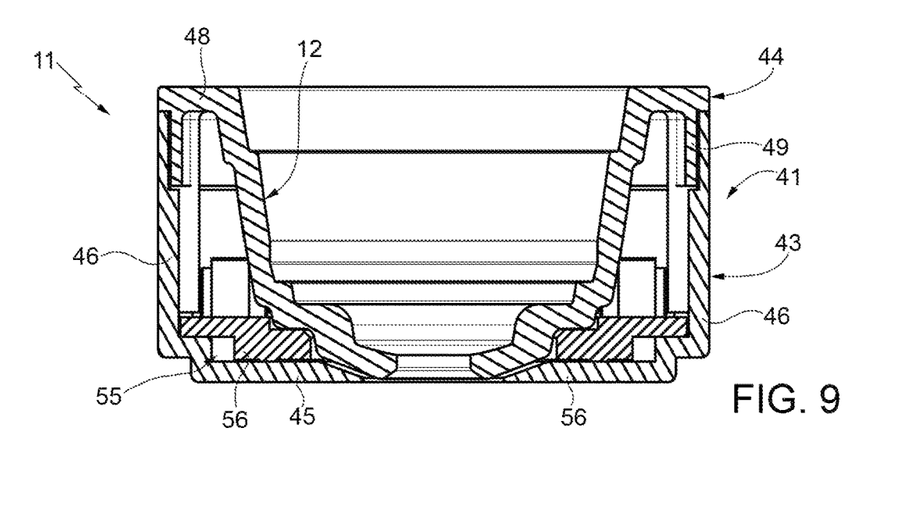
FIG. 9 is a cross section, along the plane IX-IX, of FIG. 8.
Figure 10:
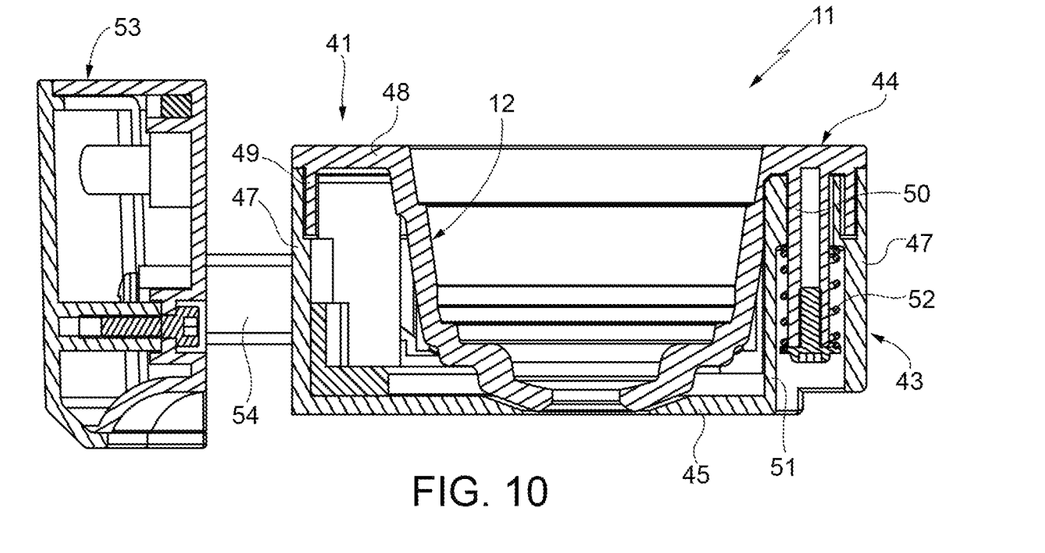
FIG. 10 is a cross section, along the plane X-X, of FIG. 8.

According to that illustrated in FIGS. 8, 10 and 15, the upper portion 44 is guided vertically onto the lower portion 43 by means of three pins 50 borne by the upper portion 44 and slidingly engaged in corresponding sleeves 51 rigidly coupled to the lower portion 43. Moreover, the upper portion 44 is normally held in said lowered position by elastic means defined by three coil springs 52 (only one of which is visible in FIGS. 10 and 15), each of which is wound about a respective pin 50 and is interposed between one end of said pin 50 and the respective sleeve 51 in order to normally keep the upper portion 44 in the lowered position in contact with the lower portion 43 and to be compressed when the upper portion 44 is raised with respect to the lower portion 43.

Figure 11:
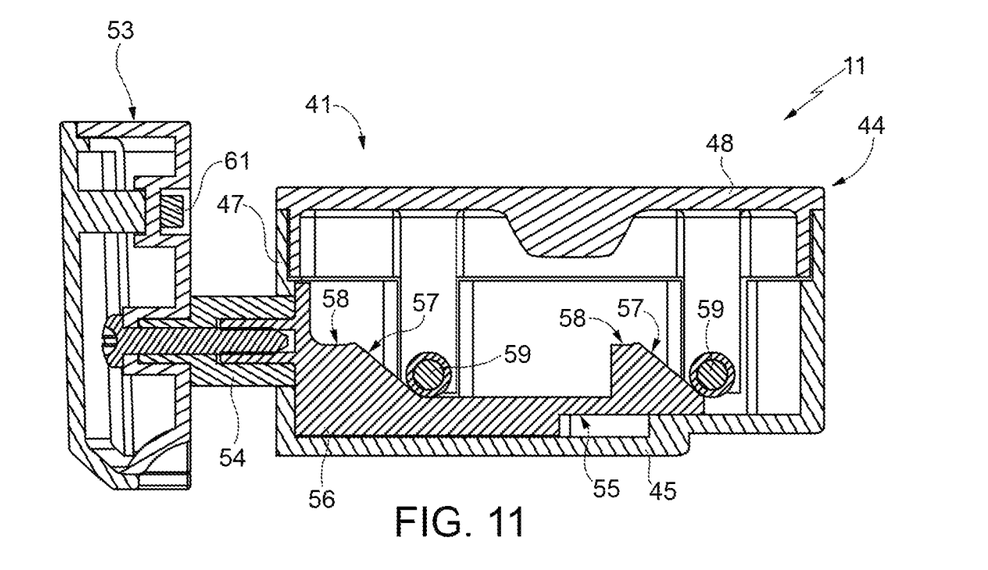
FIG. 11 is a cross section, along the plane XI-XI, of FIG. 8.
Figure 16:
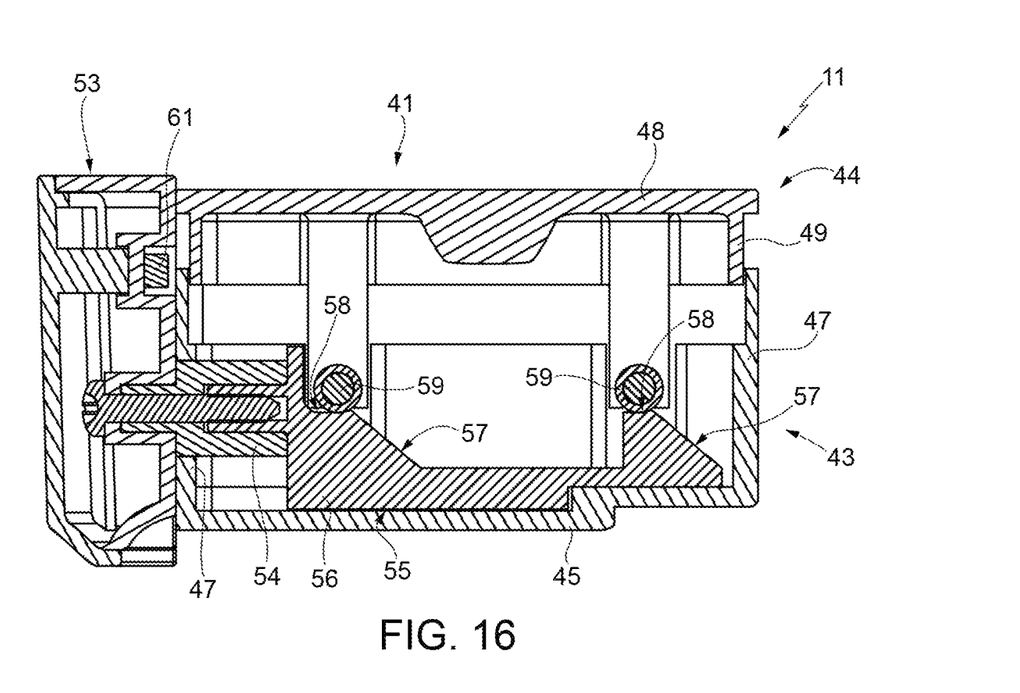
FIG. 16 is a cross section, along the plane XVI-XVI, of FIG. 13.

According to that illustrated in FIGS. 11 and 16, the capsule holder 11 further comprises a handle 53 connected to the main body 41 by means of two elongated elements 54, which are rigidly coupled to the handle 53, are parallel to the axis 42 and arranged on opposite sides of said axis 42, and engage in an axially sliding manner respective openings obtained through a transverse wall 47 of the lower portion 43 so as to allow the handle 53 to slide between a position at a distance from the main body 41 (FIGS. 7 and 8) and a position close to the main body 41 (FIGS. 12 and 13).

The movement of the handle 53 with respect to the main body 41 determines the activation of a transmission device designed to convert the horizontal rectilinear displacement of the handle 53 between the spaced position and the close position into a vertical rectilinear displacement of the upper portion 44 between the aforesaid lowered position and raised position.

In particular, according to the preferred embodiment that is illustrated in the accompanying figures, the transmission device 55 is defined by a cam mechanism housed inside the lower portion 43 and comprising two cams 56, each of which is rigidly connected to a corresponding elongated element 54, at an axial end of the latter opposite to the end to which the handle 53 is connected, and has, along an upper profile thereof, two inclined planes 57 and two horizontal planes 58, each of which is adjacent to the top of a respective inclined plane 57. The transmission device 55 further comprises follower means defined, for each cam 56, by a pair of pins 59 rigidly coupled to the upper portion 44 and each coupled to a respective inclined plane 57. The constant contact between the pins 59 and the respective inclined planes 57 is guaranteed by the springs 52 that normally hold the upper portion 44 pushed downwards and towards the lower portion 43.

The angle of the inclined planes 57 is such that when the handle 53 is moved from the spaced position to the close position, so that the cams 56 slide forward, the pins 59 follow the respective inclined planes 57 upwards from the bottom, thus raising the upper portion 44. Just before the handle 53 reaches the close position, the pins 59 engage the respective horizontal planes 58 to make the raised position of the upper portion 44 stable. Preferably, the horizontal planes 58 have a slight concavity designed to be engaged by the pins 59 in order to prevent, in use, any stress unintentionally applied to the main body 41, for instance vibrations, from undermining the stability of the raised position of the upper portion 44.

In use, once a capsule 2 has been loaded into the cavity 12 (FIG. 1), the capsule holder 11 is inserted into the seat 16 in the direction 17. In this configuration, the handle 53 is in its spaced position and the upper portion 44 is in its lowered position. The pushing force applied by the user to the capsule holder 11 via the handle 53 does not determine any displacement of the handle 53 with respect to the main body 41 in that the horizontal pushing force applied by the cams 56, rigidly coupled to the handle 53, to the pins 59 is not sufficient to overcome the resistance of the springs 52 which, through the upper portion 44, keep the pins 59 pushed downwards. Therefore the pushing force applied by the user only causes the capsule holder 11 to move forward without any relative displacement between the handle 53 and the main body 41.

When the capsule holder 11 reaches the bottom of the seat 16 and comes into contact with the transverse wall 22 of the seat 16 (FIG. 3), the main body 41 cannot move any further forward and a further pushing force applied by the user to the handle 53 causes the handle 53 to move forward towards its close position. The displacement of the handle 53 causes the cams 56 to slide forward and the subsequent raising of the upper portion 44, in the way that is described above.

When the upper portion 44 has almost reached the raised position, the capsule 2 comes into contact with the cup-shaped gasket 23 and is pushed into the cavity 12 with the subsequent deformation and perforation of the sealing film 7 by the tip 8.

When the upper portion 44 reaches the raised position (FIG. 4), the upper wall 48 of the upper portion 44 presses the flange 5 of the capsule 2 against the upper wall 19 of the seat 16, and the annular lip of the cup-shaped gasket 23 and the tubular appendages 36 are fluid-tightly pressed against the cover 4, stretched by the abutment element 38.

When the handle 53 reaches the close position this is detected by a position sensor 60 mounted on the frame 10 and connected to the electronic control unit (not illustrated), which then starts the motor 29 with the subsequent perforation of the cover 4 of the capsule 2 by means of one of the two needles 26 and 27. Preferably, but not necessarily, the sensor 60 is a Hall effect sensor coupled to a magnet 61 arranged on the handle 53.

When the user extracts the capsule holder 11 from the seat 16, the traction exerted on the handle 53 first determines a displacement of the handle 53 with respect to the lower portion 43 and the return of the upper portion to the lowered position due to the returning action of the springs 52. Once the upper portion 44 has reached the lowered position, the traction exerted on the handle 53 is rigidly transmitted to the lower portion 43 and determines the extraction of the capsule holder 11 until it reaches the loading position.

With regard to the above description, it is worth pointing out that, according to alternative embodiments that are not illustrated, the transmission device 55 could have a different architecture from that of the example illustrated in the accompanying figures, and any type of mechanism capable of converting the horizontal displacement of the handle 53 into a vertical displacement of the upper portion 44 of the capsule holder 11 could be used.

The invention claimed is:

1. A beverage brewing apparatus for preparing a beverage from a single-serve capsule containing a dose of infusible or soluble material; the beverage brewing apparatus comprising:

a capsule holder having a seat to receive a capsule in a brewing position, and an brewing fluid injection unit configured to perforate the capsule in the brewing position and to feed a brewing fluid into the capsule;

wherein the brewing fluid injection unit comprises a pair of needles, and an actuator configured to move the needles from and to a perforation and injection position; and wherein the brewing fluid injection unit is designed to cause the needles to deliver a same brewing fluid with different flow rates, and to cause the actuator, during a beverage production cycle, to bring only one of the two needles to said perforation and injection position, in which the needle perforates the capsule and injects brewing fluid into the capsule.

2. The brewing apparatus of claim 1, wherein the actuator comprises a motor and a transmission between the motor and the needles to selectively move the needles from a rest position, in which they fail to interfere with the capsule, to said perforation and injection position to perforate the capsule and inject brewing fluid in the capsule.

3. The beverage brewing apparatus of claim 2, wherein the transmission is configured to cause the needles, during a beverage production cycle, to perform equal displacements in opposite directions starting from their respective rest positions.

4. The beverage brewing apparatus of claim 3, wherein the transmission comprises two sliding blocks, each of which carries a respective needle, is slidingly mounted in a respective guide channel, and is provided with a rack; the transmission further comprises a pinion provided on an outlet shaft of the motor to mesh with the racks.

5. The beverage brewing apparatus of claim 4, further comprising a sensor to detect the axial position of the sliding blocks along the respective channels; and an electronic control unit connected to the sensor to control operation of the motor based on the axial position of the sliding blocks detected by the sensor.

6. The beverage brewing apparatus of claim 1, wherein the capsule has a cup-shaped body and a perforable cover; the beverage brewing apparatus further comprises a frame having a first portion to support the capsule holder, and a second portion to support the needles and having an end wall facing the capsule holder and configured to be passed through by the needles; the end wall and the capsule holder are mutually movable to press the end wall and the cover of the capsule one against the other.

7. The beverage brewing apparatus according to claim 6, wherein the end wall comprises sealing means arranged to couple with the cover, when the latter is pressed against the end wall, to perform a radial seal around the area of the cover to be perforated.

8. The beverage brewing apparatus of claim 7, wherein the sealing means comprise a cup-shaped gasket with an annular lip designed to couple with a periphery of the cover, and two tubular portions, each of which is configured to be engaged slidingly by a respective needle and perform a radial seal around a hole made by the needle through the cover.

9. The beverage brewing apparatus of claim 6, wherein the end wall comprises an abutment element configured to engage a central portion of the cover, when the latter is pressed against the end wall, so as to push the capsule cover inwardly to such an extent as to stretch it.

* * * * *